(12) United States Patent
Harris

(10) Patent No.: US 7,707,252 B1
(45) Date of Patent: Apr. 27, 2010

(54) AUTOMATIC MAIL REJECTION FEATURE

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 1447 days.

(21) Appl. No.: 09/690,002

(22) Filed: Oct. 16, 2000

Related U.S. Application Data

(60) Provisional application No. 60/203,729, filed on May 12, 2000.

(51) Int. Cl.
*G06F 15/16* (2006.01)
*G06F 3/00* (2006.01)

(52) U.S. Cl. ...................................... 709/206; 715/752
(58) Field of Classification Search ......... 709/206–208, 709/752; 345/752; 715/752
See application file for complete search history.

(56) References Cited

U.S. PATENT DOCUMENTS

| | | | | |
|---|---|---|---|---|
| 5,742,769 A | | 4/1998 | Lee et al. ................ | 395/200.36 |
| 5,826,022 A | | 10/1998 | Nielsen .................. | 395/200.36 |
| 5,835,722 A | | 11/1998 | Bradshaw et al. ....... | 395/200.55 |
| 5,930,479 A | | 7/1999 | Hall ....................... | 395/200.68 |
| 5,999,932 A | * | 12/1999 | Paul ....................... | 707/10 |
| 6,023,723 A | * | 2/2000 | McCormick et al. ........ | 709/206 |
| 6,161,130 A | * | 12/2000 | Horvitz et al. .............. | 709/206 |
| 6,167,434 A | * | 12/2000 | Pang ........................... | 709/206 |
| 6,199,103 B1 | * | 3/2001 | Sakaguchi et al. .......... | 709/206 |
| 6,393,465 B2 | * | 5/2002 | Leeds ......................... | 709/207 |
| 6,421,709 B1 | * | 7/2002 | McCormick et al. ....... | 709/206 |
| 6,453,327 B1 | * | 9/2002 | Nielsen ...................... | 715/500 |
| 6,493,007 B1 | * | 12/2002 | Pang ........................... | 715/835 |
| 6,701,346 B1 | * | 3/2004 | Klein .......................... | 709/206 |
| 6,707,472 B1 | * | 3/2004 | Grauman ..................... | 345/752 |
| 6,708,205 B2 | * | 3/2004 | Sheldon et al. ............. | 709/206 |
| 6,725,228 B1 | * | 4/2004 | Clark et al. ................. | 707/102 |
| 6,769,016 B2 | * | 7/2004 | Rothwell et al. ............ | 709/206 |
| 6,779,021 B1 | * | 8/2004 | Bates et al. ................. | 709/206 |
| 6,868,436 B1 | * | 3/2005 | Fleming, III ................ | 709/206 |
| 6,874,023 B1 | * | 3/2005 | Pennell et al. .............. | 709/224 |
| 2002/0026356 A1 | * | 2/2002 | Bergh et al. ................ | 705/14 |
| 2002/0198784 A1 | * | 12/2002 | Shaak et al. ................ | 705/26 |
| 2003/0097361 A1 | * | 5/2003 | Huang et al. ............... | 707/10 |

OTHER PUBLICATIONS

Bass et al. "A simple Framework for Filtering Queued SMTP Mail" 1997 IEEE, MILCOM 97 Proceedings, vol. 3, Nov. 2-5, 1997 pp. 1140-1144 vol. 3.*
Bayes, Thomas (1701-1761) "Theories—>Bayesian filters" http://www.securedomains.com.au/support/node37.html.*

* cited by examiner

*Primary Examiner*—J Bret Dennison
(74) *Attorney, Agent, or Firm*—Law Ofc SC Harris

(57) ABSTRACT

A spam defining system defines rules about emails depending on user's reactions to emails. A user can delete an email as spam, or not spam, or without committing to whether the email is spam or not. If the user indicates whether the email is spam or not spam; characteristics of the email are used to update a database. Incoming emails are compared against the database, to determine a likelihood of whether they are spam.

29 Claims, 2 Drawing Sheets

| Field | Value | Weighting | Result # |
|---|---|---|---|
| 202 — Received from | Jerk@me.com | 206 — 75 | |
| 204 — Domain | Me.com | U/10 | |
| 210 — Subject | University Diplomas | | N |
| 215 — Text | Get Rich Quick | | S |
| 220 — Links | | | |
FIG. 2
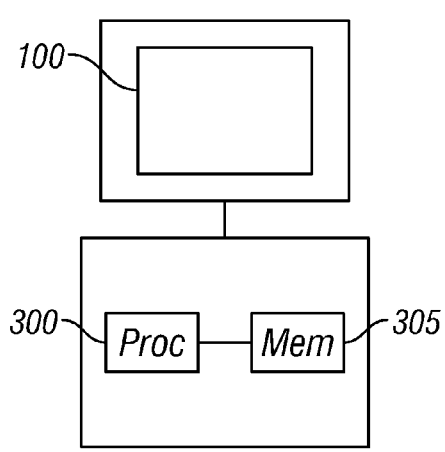
FIG. 3
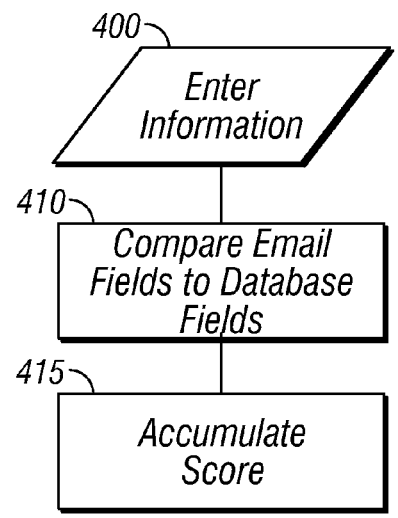
FIG. 4

AUTOMATIC MAIL REJECTION FEATURE

This application claims priority from provisional application No. 60/203,729, filed May 12, 2000.

BACKGROUND

This invention relates to an automatic mail rejection feature in an e-mail program.

E-mail can be an inexpensive and effective way of sending information. Because of this, a recurrent problem is "spam", or the sending of unwanted email to a certain person. Once an e-mail address gets on a spammer's list, the person can be barraged with junk email. Various attempts have been made to combat this problem.

For example, some web e-mail programs include the ability to block further mail from a specified sender. When junk mail is received from a specified address, the control is actuated. Further mail from that specified sender is then blocked, presumably automatically deleted or sent to the trash.

Certain laws also cover spamming, and require that each e-mail that is sent unsolicited have a way of unsubscribing from the list. Spammers combat both of these measures by continually changing their name and/or changing their return address.

Some e-mail programs allow a user to manually set criteria for rejection of incoming email. For example, if an incoming e-mail is from a domain that has many known spammers, many people may simply set their program to delete it. However, this has the unintended extra effect of also removing desired email, at times.

In addition, the automatic rejection feature does nothing to resolve the traffic caused by junk e-mail.

SUMMARY

The present application teaches an automatic system which automatically recognizes certain aspects of undesired messages such as junk email and undesired Internet content. The system automatically produces recommendations of criteria to use in automatically removing undesired information.

In an email embodiment described herein, these criteria can be automatically enforced or can be presented to the user as a table of options. In addition, the system can look for keywords in the e-mail, and can automatically postulate strategies for rules based on these keywords.

BRIEF DESCRIPTION OF THE DRAWINGS

These and other aspects will be described in detail with reference to the accompanying drawings, wherein:

FIG. 2 shows a determined spam message, and the parsing scheme used on it;

FIG. 3 shows an exemplary computer system; and

FIG. 4 shows and operational flowchart.

DESCRIPTION OF THE PREFERRED EMBODIMENT

Figure 1:
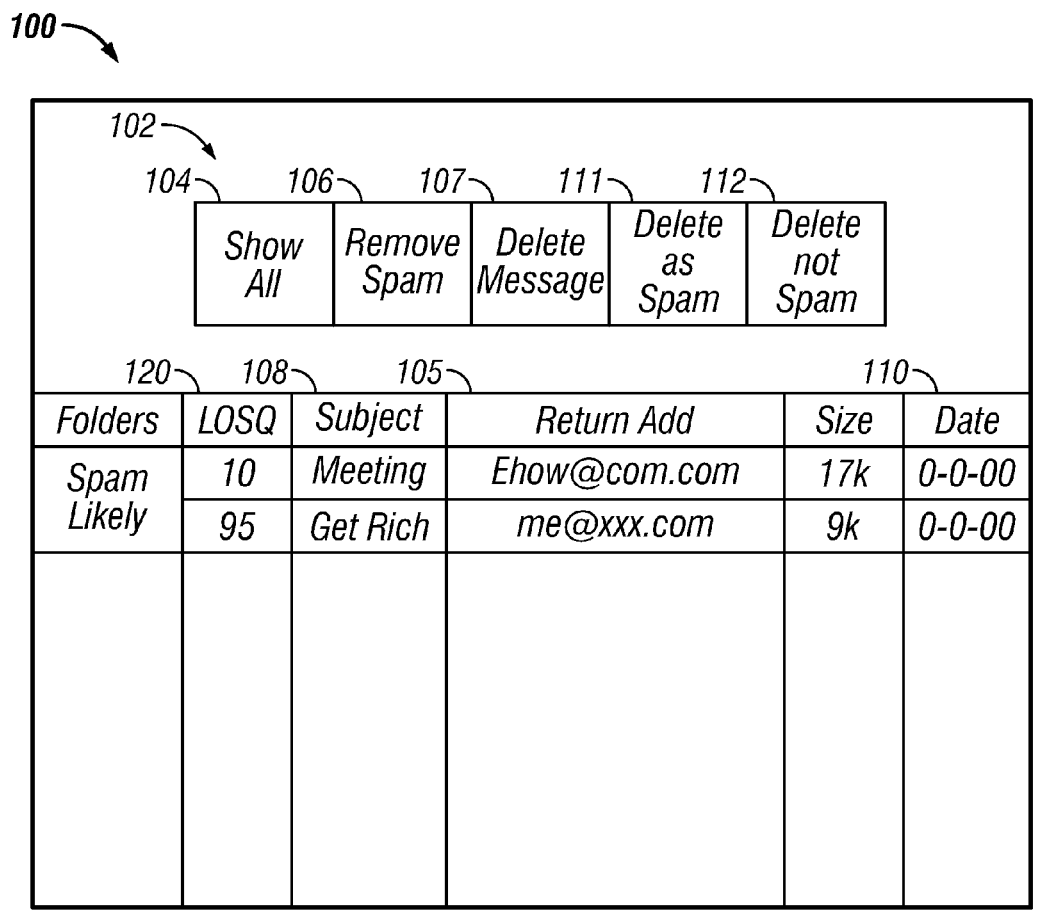
FIG. 1 shows an email browser window.

A first embodiment describes an e-mail program which allows automatic rejection of unwanted messages. The embodiment runs on a computer shown in FIG. 3, having a processor 300 and memory 305. A typical e-mail browser window is shown in FIG. 1. The browser window include a number of operating buttons 102, a list of return addresses, and message subject. This browser also includes and displays a measure of likelihood of spam quotient or "LOSQ". The likelihood of spam quotient is displayed in the rightmost column as a percentage. For example, a message that is known to be spam would have a likelihood of spam quotient of 100%. Other messages that are less likely to be spam may have a likelihood of spam quotient of something less than 100%.

The likelihood of spam quotient can be displayed as a number as shown in FIG. 1, or alternately can be displayed by the color of the message being displayed. For example, the message can be displayed in green to indicate low likelihood of spam (e.g. less than 10%) and yellow to indicate medium likelihood of spam (e.g. between 10 and 80 percent, and in red to indicate high likelihood of spam; for example likelihood of 80 to 100 percent to be spam, for example.

One of the buttons 106 on the toolbar requests removal of the high spam likelihood messages from the inbox. This enables, in a single click, removing all high likelihood of spam messages. Another button 120 is an options button which brings up the options menu of FIG. 2.

The function buttons in FIG. 1 include, as conventional, a delete message button 107. An additional a "delete as spam" button 111 is also provided. Any message that is deleted as being spam is further processed to determine characteristics that can be used to process other messages. Characteristics of the deleted-as-spam message are used to update the rules database to indicate characteristics of the spamming messages.

Another button 112 is also provided indicating "delete the message; not spam". Therefore, the user is presented with three different options: delete the message without indicating whether it is spam or not, delete the message while indicating that it is spam, or delete the message indicating that it is not spam.

The latter two options are used to update the rules in the rules database as described in further detail herein. Hence, this option allows adding an incoming e-mail message to the spam list, when it is determined to be likely to be spam.

FIG. 1 also shows a number of different ways of displaying different email. The first option, labeled "show all messages", on button 104, has the function, as it suggests, of showing all messages. The messages may be further characterized based on the likelihood that they are spam. As described herein, the messages are characterized by comparing them with rules. Each match with the rules may increase the score, and make it more likely that the message is spam. More about this operation is described herein.

Those messages which are likely not spam are shown in a neutral color such as green or black. The messages which are questionable are shown in a cautionary color, such as yellow highlight. Finally, the messages which are likely to be spam are shown in an alert color such as red.

A second display option displays only those messages which are likely to represent desired messages. Hence, only the green and yellow messages are displayed. According to one embodiment, the messages are sorted by date and time received. Within each day, the messages are sorted by likelihood of being spam. The spam-likely messages, which are determined to be likely to represent spam, may be put into a separate folder; here shown as "spam-likely messages".

The messages which are likely to represent undesired information can be read by the user. If not read by the user, they are kept in the folder for a specified period of time e.g. thirty days, before deleting.

The incoming messages are processed based on rules. For example, if one does not want to be on a mailing list about xxx type items, then messages that include the text "free xxx pictures" may be likely to be spam. However, other people may find those messages to be highly desirable. Similarly, messages about get rich quick schemes may be trash to one person, treasure to another.

The present system allows customization of which emails to remove as spam, by defining rules. Each time a message is deleted as spam, a number of aspects about that message are stored. A database is used to store the message. This database may include relative weighting of different aspects. FIG. 2 shows a determined spam message, and the parsing scheme.

The sender of the message is often a highly determinative factor. For example, if a specific sender sends one spam message, the same sender is very likely to be sending another spam message later on. Therefore, a first item in the database is the "received from" field 202. In addition to the specific sender, however, the domain of the sender often gives information. This domain is reviewed at 204. If the domain is a common domain such as Yahoo.com or Hotmail.com, then the relevance of the sender's domain may not be probative. If, however, the domain name is uncommon, such getrichquick.com or the like, then it is more likely that other message from that domain would be spam. Further, many messages from a common domain may itself be probative. The domain information is weighted accordingly.

The domain name from an item is added to the rules database from field 204. Another field 206 stores an indication of whether the domain is a common domain or an uncommon/specific domain. This determination is initially zero, and is changed depending on the number of hits of domains that become present in the database. For example, when two different addresses from the same domain become spam, then the value becomes presumptly H (likely to be spam). When two different addresses from the same domain are received, one spam, the other not, then the value presumptively becomes L.

Each sentence and field in the e-mail, including subject; text of the body; links in the email, and any others is then stored as a separate field.

Analogous information may also be categorized from emails that are deleted as "not spam". This provides a database of characteristics that are likely to represent spam messages, and other characteristics that are less likely to represent spam messages. Matching with the databases changes the scoring of the message accordingly.

Once the database becomes sufficiently large, it may become time-consuming to compare incoming messages with the database. Indexing approaches can be used to increase the speed of the comparison. The detailed comparison may also be done in the background; the message may be displayed, and its classification displayed only some time later.

FIG. 4 shows incoming messages received at 400 being broken down into analogous parts to those parts that are cataloged in the database 410. Each part in the incoming e-mail is compared with each part in the database. A simplified index can be prepared, such as the type used for internet searching, in order to speed up the searching. Each match changes the scoring of the email, to make it more likely to be spam, or less likely to be spam at 415. Each field match has a specified score increase. For example, match from the addressee is a very powerful indication of spam, and may by itself carry a score of 75. 100% matching of a sentence may carry a score of 10. A 50% word match may carry a score of 3. Match of the hyperlinks in an e-mail to those in a previously spammed determined e-mail may carry a score of 5.

Similarly, the e-mail and its fields can be compared with non-spam indicative email. An e-mail which is not spam can carry negative scores, for example. Finding the e-mail address to be on the non-spam list, for example, can carry a score of negative 100, or can immediately abort the process with an indication of non-spam.

If a message has few matches to the database, it may be characterized as unknown or cautionary (yellow). Similarly, mixed signals (some matches to spam and non-spam database), may result in an unknown result.

The total score for an e-mail is assessed, and this total score is used to assess if the e-mail is spam or not. If the e-mail is determined to be spam, then it is appropriately processed.

Many different rules databases can be used.

Such modifications are intended to be encompassed.

What is claimed is:

1. A method, comprising:
receiving an electronic mail message in a computer;
using the computer for displaying information about the electronic mail message;
using the computer for displaying all of first, second and third controls, where said first control causes the computer to delete the message without indicating whether the message does represent a spam message or does not represent a spam message, the second control causes the computer to delete the message while indicating that it does represent a spam message, and the third control causes the computer to delete the message while indicating that the message does not represent a spam message; and
using the computer for storing a database of scam likelihood, and wherein said deleting using said second and third controls causes changes to information in the database of spam likelihood, and said deleting using said first control does not cause changes to information in said database of spam likelihood.

2. A method as in claim 1 wherein said deleting using said second and third controls changes at least one rule in a rules database, and said deleting using said first control does not cause changes of said rules in said rules database.

3. A method as in claim 2 wherein said rules include information about fields from said electronic mail message.

4. A method as in claim 3 wherein said fields from said electronic mail message which are used to change said rules include at least a sender of the e-mail message, text of the e-mail message, and a subject of the e-mail message, and wherein each of said fields are used as parts of rules in said rules database.

5. A method as in claim 4 wherein said fields from said electronic mail message which are used to change said rules also include a domain of a sender of the e-mail message.

6. A method as in claim 2, wherein said fields from said electronic mail message which are used to change said rules include links within the e-mail message, where certain links in an email message represent that the electronic mail message is more likely to represent spam.

7. A method as in claim 2, further comprising using the computer to automatically classify an incoming message as a spam message, or not as a spam message, based on said rules in said database as changed by said first and second controls.

8. A method as in claim 7, further comprising displaying the messages along with an indication of whether they have been classified to represent spam or not to represent spam.

9. A method as in claim 7, further comprising displaying messages that have not been classified to represent spam in a first view, and displaying messages that do represent spam in a second view.

10. A product as in claim 7, further comprising displaying messages that have not been classified to represent spam in a first view, and displaying messages that do represent spam in a second view that is wholly separate from the first view.

11. A method as in claim 2, wherein one of said fields from said electronic mail message includes a domain of the sender, said domain being used to change said rules in said database.

12. A method as in claim 11, wherein the first rule is changed to represent a higher probability of spam when all senders from a specific domain represent spam, and to represent a lower probability of spam when some senders from said domain represent spam and other senders from said domain do not represent spam.

13. A method as in claim 2, wherein said changes to said rules in said database uses multiple different techniques to analyze the message and to determine that the message likely represents a spam message.

14. A method as in claim 1, further comprising using the computer for displaying said spam likelihood as a numerical percentage indicating a likelihood that the message represents spam.

15. A method as in claim 1, further comprising displaying a message in a color, where the color represents a likelihood that the message represents spam.

16. A computer product, comprising a processor and memory storing executable instructions that when executed, implement an email program, said executable instructions comprising:
   an email receiving part that receives emails;
   a display output which produces an output which displays a plurality of said e-mails and also displays and accepts input from a plurality of controls including both of:
   a first control which selects deleting an e-mail while indicating that said e-mail is spam and reports information indicative of said email to a spam determining database, and
   a second control which selects deleting an e-mail while indicating that said e-mail is not spam and reports information indicative of said email to said spam determining database;
   a database update part that adds information indicative of said information reported by said first control and said second control to said spam determining database; and
   a spam determining part that analyzes said emails received by said email receiving part based on information in said database as updated by said database update part.

17. A program as in claim 16, wherein said display output displays a likelihood of spam coefficient which indicates a numerical percentage likelihood that the associated message represents spam.

18. A program as in claim 16, wherein said display output further displays a third control which selects deleting an e-mail without indicating or not indicating whether said e-mail represents spam.

19. A product as in claim 16, further comprising a display part which displays the messages analyzed by said spam determining part along with an indication of whether they have been classified to represent spam or not to represent spam.

20. A product as in claim 16, wherein said database update part uses a domain of the sender to change said rules in said database.

21. A product as in claim 20, wherein the first rule is changed to represent a higher probability of spam when all senders from a specific domain represent spam, and to represent a lower probability of spam when some senders from said domain represent spam and other senders from said domain do not represent spam.

22. An apparatus, comprising:
   a computer which receives an electronic mail message over an electronic channel;
   said computer automatically comparing said electronic mail message with information indicative of undesired electronic mail messages; and
   said computer producing a user interface that displays information about said electronic mail message, and which user interface allows a selection to all of:
   A) delete the message without indicating whether or not the message represents spam,
   B) delete the message while indicating that the message does indicate spam, and using information from a first message deleted as spam to change said information indicative of undesired electronic mail messages; and
   C) delete the message while indicating that the message does not indicate spam, and using information from a second message deleted as spam to change said information indicative of desired electronic mail messages;
   said computer comprising a database of information indicating likelihood of spam, and wherein said delete while indicating that the message does indicate spam changes information in said database and said delete while indicating that the message does not indicate scam changes information in said database.

23. An apparatus as in claim 22, further comprising displaying a message in a color, where the color represents a likelihood that the message represents spam.

24. A method as in claim 22, wherein said computer automatically classifies an incoming message as being a spam message, or not being a spam message, based on said information indicative of undesired electronic mail messages as updated by said first and second messages.

25. A method as in claim 24, wherein said computer produces an output that displays the messages along with an indication of whether they have been classified to represent spam or not to represent spam.

26. A method as in claim 24, wherein said computer produces an output that displays the messages that have not been classified to represent spam in a first view, and displaying messages that do represent spam in a second view that is separate from said first view.

27. A method as in claim 24, wherein said information from said first and second messages includes a domain of the sender, said domain being used to change said information indicative of undesired electronic mail messages.

28. A method as in claim 27, wherein the first rule is changed to represent a higher probability of spam when all senders from a specific domain represent spam, and to represent a lower probability of spam when some senders from said domain represent spam and other senders from said domain do not represent spam.

29. A method as in claim 24, wherein said changes to said rules in said database uses multiple different techniques to analyze the message and to determine that the message likely represents a spam message.

* * * * *